United States Patent
Paniccia (10) Patent No.: US 6,330,376 B1
(45) Date of Patent: Dec. 11, 2001

(54) HIGHER ORDER REJECTION METHOD AND APPARATUS FOR OPTICAL MODULATOR

(75) Inventor: Mario J. Paniccia, Santa Clara, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/283,106

(22) Filed: Mar. 31, 1999

Related U.S. Application Data (63) Continuation-in-part of application No. 08/993,786, filed on Dec. 19, 1997, now Pat. No. 6,075,908.

(51) Int. Cl.$^7$ ..................................................... G02B 6/12
(52) U.S. Cl. ............................................ 385/14; 359/245
(58) Field of Search ................................... 385/1–3, 8, 10, 385/14, 37, 40; 359/245, 246, 254, 263, 276, 279, 566, 569, 573

(56) References Cited

U.S. PATENT DOCUMENTS

| | | |
|---|---|---|
| 4,422,088 | 12/1983 | Gfeller . |
| 4,695,120 | 9/1987 | Holder ..................................... 385/14 |
| 4,758,092 | 7/1988 | Heinrich et al. ...................... 356/364 |
| 4,761,620 | 8/1988 | Bar-Joseph et al. ................. 332/7.51 |

(List continued on next page.)

OTHER PUBLICATIONS

Miller, DAB: "Reason and Prospects for Dense Optical Interconnections", Presentation by Stanford University Professor, (Oct. 1997).

Sakano, S. et al.: "InGaAsP/InP Monolithic Integrated Circuit with Lasers and an Optical Switch," *Electronics Letters*, 22(11), May 1986.

(List continued on next page.)

*Primary Examiner*—Rodney Bovernick
*Assistant Examiner*—Michael Stahl
(74) *Attorney, Agent, or Firm*—Blakely, Sokoloff, Taylor & Zafman LLP (57) ABSTRACT

An optical modulator that modulates light through the semiconductor substrate through the back side of a flip chip packaged integrated circuit. The optical modulator of the present invention enables integrated circuit signals to be extracted through the back side of the semiconductor substrate. In one embodiment, an optical modulator is disposed within a flip chip packaged integrated circuit die. The optical modulator includes a deflector and a diffraction grating. An infrared light beam is directed through the back side of a silicon substrate of the integrated circuit die, deflected off the deflector through the diffraction grating and back out the back side of the integrated circuit die. The diffraction grating modulates the phase of a portion of the deflected light beam in response to an integrated circuit signal. A resulting diffraction interference occurs between the phase modulated portions and nonphase modulated portions of the deflected light beam. The interference causes amplitude modulation of a zero order diffraction of the deflected light beam, from which the integrated circuit signal can be extracted. The zero order diffraction is allowed to pass through an optical passage to exit the semiconductor substrate of the flip chip packaged integrated circuit die while the non-zero order diffractions are blocked.

27 Claims, 7 Drawing Sheets

U.S. PATENT DOCUMENTS

| | | |
|---|---|---|
| 4,865,427 | 9/1989 | Kingston et al. . |
| 4,871,224 | 10/1989 | Karstensen et al. . |
| 4,917,450 | 4/1990 | Pocholle et al. . |
| 4,966,430 | 10/1990 | Weidel ................................. 385/14 |
| 5,061,027 | 10/1991 | Richard . |
| 5,153,770 | 10/1992 | Harris ................................. 359/245 |
| 5,159,700 | 10/1992 | Reid et al. . |
| 5,198,684 | 3/1993 | Sudo . |
| 5,237,435 * | 8/1993 | Kurematsu et al. ................... 359/41 |
| 5,400,419 | 3/1995 | Heinen . |
| 5,432,630 | 7/1995 | Lebby et al. . |
| 5,434,434 | 7/1995 | Kasahara et al. ...................... 257/84 |
| 5,485,021 | 1/1996 | Abe . |
| 5,495,280 * | 2/1996 | Gehner et al. ....................... 347/258 |
| 5,502,779 | 3/1996 | Magel . |
| 5,568,574 | 10/1996 | Tanguay, Jr. et al. ................ 385/14 |
| 5,574,537 * | 11/1996 | Ozawa ................................. 355/71 |
| 5,605,856 | 2/1997 | Goosen et al. . |
| 5,625,636 | 4/1997 | Bryan et al. . |
| 5,629,838 | 5/1997 | Knight et al. . |
| 5,638,469 | 6/1997 | Feldman et al. . |
| 5,696,862 | 12/1997 | Hauer et al. . |
| 5,835,646 | 11/1998 | Yoshimura et al. ................... 385/14 |
| 5,864,642 | 1/1999 | Chun et al. ............................ 385/14 |
| 5,872,360 | 2/1999 | Paniccia et al. . |
| 6,075,908 * | 1/2000 | Paniccia et al. ...................... 385/14 |

OTHER PUBLICATIONS

Mansuripur, M. and Goodman, JW: "Signal and Noise in Magneto–Optical Readout," *J. Appl. Phys.*, 53(6), Jun. 1982.

Alping, A et al.: "Highly Efficient Waveguide Phase Modulator for Integrated Optoelectronics," *Appl. Phys. Lett.*, 48(19), May 1986.

Levitan, SP et al.: "Computer–Aided Design of Free–Space Opto–Electronic Systems," *DAC 97*, Anaheim, California (1997), (no month avail.).

Goodman, JW et al.: "Optical Interconnections for VLSI Systems," *Proc. IEEE*, 72(7), Jul. 1984.

Wang, C. et al.: "Ultrafast, All–Silicon Light Modulator," *Optics Letters*, 19(18), Sep. 1994.

Tada, K. and Okada, Y: "Bipolar Transistor Carrier–Injected Optical Modulator/Switch: Proposal and Analysis," *IEEE Electr Dev Ltrs*, 7(11), Nov. 1986.

Fernando, C. et al: "Si/$Si_{0.85}$/$GE_{0.15}$/Si P–I–N Waveguide Optical Intensity Modulator," *SPIE*, vol. 2402(131), 1995, (no month avail.).

Raybon, G., et al.: "A Reconfigurable Optoelectronic Wavelength Converter based on an Integrated Electroabsorption Modulated Laser Array" in *1997 Digest of the IEEE/LEOS Summer Topical Meetings*, Montreal, Quebec, Canada, Aug. 1997.

Reiley, DJ, and Sasian JM: "Optical Design of a Free–Space Photonic Switching System" in *Applied Optics*, vol. 36(19), Jul. 1997.

Cutolo, A., et al.: Silicon Electro–Optic Modulator Based on a Three Terminal Device Integrated in a Low–Loss Single–Mode SOI Waveguide in *J. of Lighwave Technology*, vol. 15(3), Mar. 1997.

Koren, U., et al.: "A Polarization Insensitive Semiconductor Optical Amplifier with Integrated Electroabsorption Modulators" in *Integrated Photonics Research*, Apr. 29–May 2, 1996 Technical Digest Series, vol. 6, 1996.

Krishnamoorthy, AV, and Miller, DABM: "Free–Space Optical Interconnections for VLSI Systems: A Technology Roadmap", Conference Proceedings Leos '96 9th Annual MeetingU IEEE Lasers and Electro–Optics (vol. 1), Nov. 1996.

Goosen, KW: "GaAs MQW Modulators Integrated With Silicon CMOS" in *IEEE Photonics Technology Letters*, vol. 7(4), Apr. 1995.

"Optoelectronic VLSI Foundry Services From Lucent Technologies", Lucent Technologies Bell Labs Innovations Web Page at http://www.bell–labs.com/project/oevlsi/, updated Mar. 2, 1997.

"Process for Fabricating OE/VLSI Chips", Lucent Technologies Bell Labs Innovations Web Page at http://www-.bell.labs.com/project/oevlsi/wfabproc.html, updated Sep. 26, 1996.

"Detailed Design Rules for Workshop Chips", Lucent Technologies Bell Labs Innovations Web Page at http://www-.bell–labs.com/project/oevlsi/wdesrule.html, updated Mar. 7, 1997.

Silva, MTC and Herczfeld PR: "Optical Intensity Modulator Based on Electrically Induced Periodic Structure" Optoelectronics and Systems Research Laboratory, Sao Paulo & Center for Microwave & Lightwave Engineering., Drexel Univ., Philadelphia, PA, (no date avail.).

Kuwamura, Y, et al.: "Analysis of Operating Mechanism in Semiconductor Optical Modulator with Electron–Depleting Absorption Control" in *Electronics and Communications in Japan*, vo. 79(5), Dec. 1995.

Liu, MY and Chou, SY: "High–Modulation–Depth and Short–Cavity–Length Silicon Fabry–Perot Modulator with Two Grating Bragg Reflectors" in *Appl. Phys. Lett.* vol. 68(2), Jan. 1996.

Orobtchouk, R., et al.: "Quasi–TEoo Singlemode Optical Waveguides for Electro–optical Modulation at 1.3μm Using Standard SIMOX Material" in *IEEE Proc. Optoelectron*, vol. 144(2) Apr. 1997.

Soref, RA: "Electrooptical Effects of Silicon" in *IEEE J of Quantum Electron.* vol. QE–23(1), Jan. 1987.

Cutolo, A., et al.: "An Electrically Controlled Bragg Reflector Integrated in a Rib Silicon on Insulator Waveguide" in *Appl. Phys. Lett.* vol 71(2), Jul. 1997.

Heinrich, HK: "A Noninvasive Optical Probe for Detecting Electrical Signals in Silicon Integrated Circuits", Doctoral Disseertation, Stanford Univ., (Apr. 1987).

\* cited by examiner

HIGHER ORDER REJECTION METHOD AND APPARATUS FOR OPTICAL MODULATOR

RELATED APPLICATIONS

This application is a continuation-in-part application of application Ser. No. 08/993,786, filed Dec. 19, 1997, now U.S. Pat. No. 6,075,908 entitled "Method and Apparatus For Optically Modulating Light Through The Back side of an Integrated Circuit Die," and assigned to the Assignee of the present application.

BACKGROUND OF THE INVENTION

1. Field of the Invention

The present invention relates generally to integrated circuits and, more specifically, the present invention relates to the modulation of light using integrated circuits.

2. Description of the Related Art

Within the integrated circuit industry there is a continuing effort to increase integrated circuit speed as well as device density. One challenge that integrated circuit designers face with increasing circuit speeds and device densities is the increasingly significant propagation delays of circuit inputs and outputs due to the capacitive loading associated with off chip circuit connections. At slower clock speeds, the capacitive loading on integrated circuit lines is generally not a significant factor. However, as newer integrated circuit design clock speeds continue to climb towards the gigahertz range and beyond, it is evident that one of the major bottlenecks for future integrated circuits, such as for example but not limited to microprocessors, off chip caches, controllers, etc., will be the input/output bandwidth and/or round trip delay between and within chips.

Prior art attempts to address the capacitive loading problems associated with increased integrated circuit speeds and device densities have resulted in the use of larger and more powerful integrated circuit input/output drivers on the chip. Undesirable consequences of utilizing larger input/output drivers include the facts that the larger input/output drivers generally consume more power, create large di/dt noise, which requires low inductance packaging and large amount of on-die decoupling capacitance to provide a means of noise suppression, dissipate more heat and occupy more valuable area on the integrated circuit die than smaller integrated circuit input/output drivers.

Other prior art attempts to overcome traditional integrated circuit interconnection limitations have included the use of optical interconnections. The prior art attempts at optical interconnections between integrated circuits have generally involved or have been based on two typical approaches.

One approach has been based on either using gallium arsenide (GaAs) laser diodes and modulating or switching the diodes electrically or by using GaAs built modulators that amplitude modulate a laser beam passing through the integrated circuit. The modulation is generally based on electroabsorption through strained multi-layer grown molecular beam epitaxy (MBE) films in GaAs integrated circuits. As can be appreciated to those skilled in the art, it is difficult and therefore impractical to integrate or combine III-V based technology, which includes GaAs, with standard silicon based complementary metal oxide semiconductor (CMOS) technology.

The second typical prior art approach is based on using silicon based optical waveguides. These waveguides are generally built using Silicon-on-Insulator (SOI) based processing techniques. Prior art SOI based modulators utilize silicon waveguide structures to switch light passing through the optical waveguide. The switching mechanism however utilizes injection of carriers into the waveguide rather like in a bipolar-based transistor. One consequence of this is slow speed, for example up to several hundred megahertz, and very high power consumption, for example 10 mW or more for a single switch. In order to increase the modulation depth, one often tries to obtain a large interaction volume between the injected charge and the light beam. This is generally accomplished by making very long waveguides, for example on order of thousands of microns, thereby increasing the interaction length through which the light beam travels. As can be appreciated to those skilled in the art, actual incorporation of SOI waveguides into existing multi-layer standard CMOS based processing however is not straight forward. Hence, utilization of these waveguide structures becomes quite impractical when used for high-speed input/output in large transistor count microprocessors.

SUMMARY OF THE INVENTION

An optical modulator is disclosed. In one embodiment, the optical modulator includes a diffractor disposed in a semiconductor substrate of an integrated circuit die. The diffractor produces a diffracted optical beam in response to a signal. The diffracted optical beam includes a plurality of diffraction orders. The optical modulator also includes an optical passage though which one of the plurality of diffraction orders passes. This of diffraction order is directed from the diffractor through the semiconductor substrate to pass through the optical passage. The optical modulator also includes an optical block disposed proximate to the optical passage. The optical block blocks other diffraction orders from passing. Additional features and benefits of the present invention will become apparent from the detailed description, figures and claims set forth below.

BRIEF DESCRIPTION OF THE DRAWINGS

The present invention is illustrated by way of example and not limitation in the accompanying figures.

DETAILED DESCRIPTION

A method and an apparatus providing optical input/output in an integrated circuit is disclosed. In the following description numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

The present invention provides an optical modulator that enables integrated circuit signals to be extracted from the output circuit nodes through the back side of the semiconductor substrate of a flip chip packaged integrated circuit die. In one embodiment, an optical modulator is disposed within a flip chip packaged integrated circuit die. An infrared light beam is directed through the back side of a semiconductor substrate of the integrated circuit die, passes through the optical modulator and is deflected back out of the back side of the integrated circuit die. In one embodiment, the presently described optical modulator includes a diffraction grating. The diffracting property of the diffraction grating is modulated in response to an integrated circuit signal. In one embodiment, the described diffraction grating modulates the phase of a portion of the deflected light beam in response to the applied signal. A resulting diffraction interference occurs between the phase modulated portions and non-phase modulated portions of the deflected light beam. The diffracted light beam includes a plurality of diffraction orders including a zero order diffraction and non-zero order diffractions. The interference of the two beams results in an amplitude modulation of the zero order and non-zero order diffractions of the deflected light beam. In one embodiment, the non-zero order diffractions are rejected from passing back out the semiconductor substrate through the back side of the integrated circuit die. In another embodiment, a first order diffraction passes back out the semiconductor substrate through the back side of the integrated circuit die and the other diffraction orders are rejected from passing.

Figure 1:
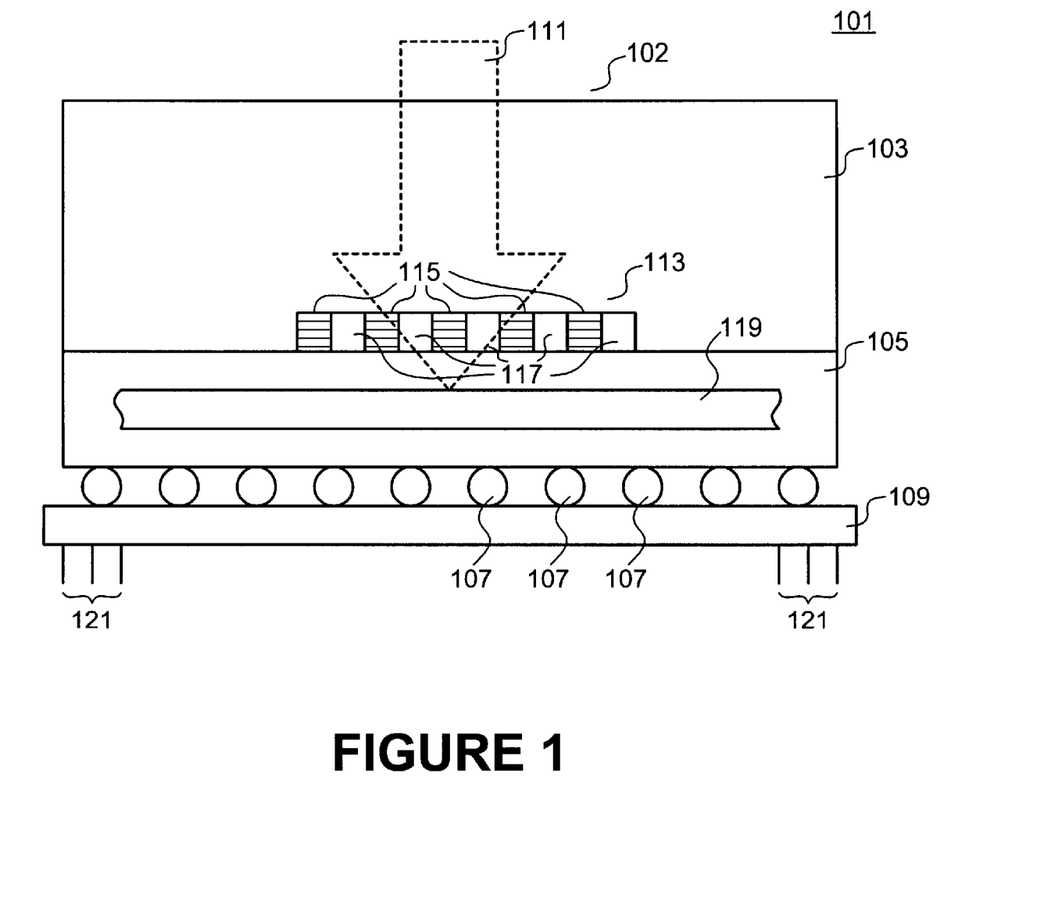
FIG. 1 is an illustration of a cross section of one embodiment of a flip chip packaged integrated circuit die with light entering from the back side in accordance with the teachings of one embodiment of the present invention.

To illustrate, FIG. 1 shows one embodiment of an integrated circuit die 101 including an optical modulator in accordance with the teachings of the present invention. In one embodiment, integrated circuit die 101 is a controlled collapse circuit connection (C4) or flip chip packaged integrated circuit die coupled to package substrate 109 through ball bonds 107. As can be appreciated by those skilled in the art, ball bonds 107 provide more direct connections between the internal integrated circuit nodes of integrated circuit die 101 and the pins 121 of package substrate 109, thereby reducing inductance problems associated with typical wire bond integrated circuit packaging technologies. Another characteristic of flip chip packaging is that full access to a back side 102 of integrated circuit die 101 is provided.

In one embodiment, the optical modulator of the present invention includes a diffraction grating 113 disposed within the semiconductor substrate 103 of integrated circuit die 101. In one embodiment, diffraction grating 113 is electrically addressable and switchable, and includes an arrangement of a plurality of charged regions 115 distributed among a plurality of uncharged regions 117.

It is noted that for purposes of this disclosure, a "charged" region may simply be interpreted as a highly charged region having free charge carriers and an "uncharged" region may simply be interpreted as a region substantially without free charge carriers.

In one embodiment, a light beam 111 is directed through back side 102 into semiconductor substrate 103 and is deflected from a deflector 119, as shown in FIG. 1. In one embodiment, semiconductor substrate 103 includes silicon and light beam 111 includes infrared light with a wavelength such that the photon energy is lower than the semiconductor band gap. As known to those skilled in the art, silicon is partially transparent to infrared light. In one embodiment, deflector 119 is a conductor, such as for example but not limited to a metal layer disposed in a dielectric isolation layer 105 of integrated circuit die 101.

Figure 2:
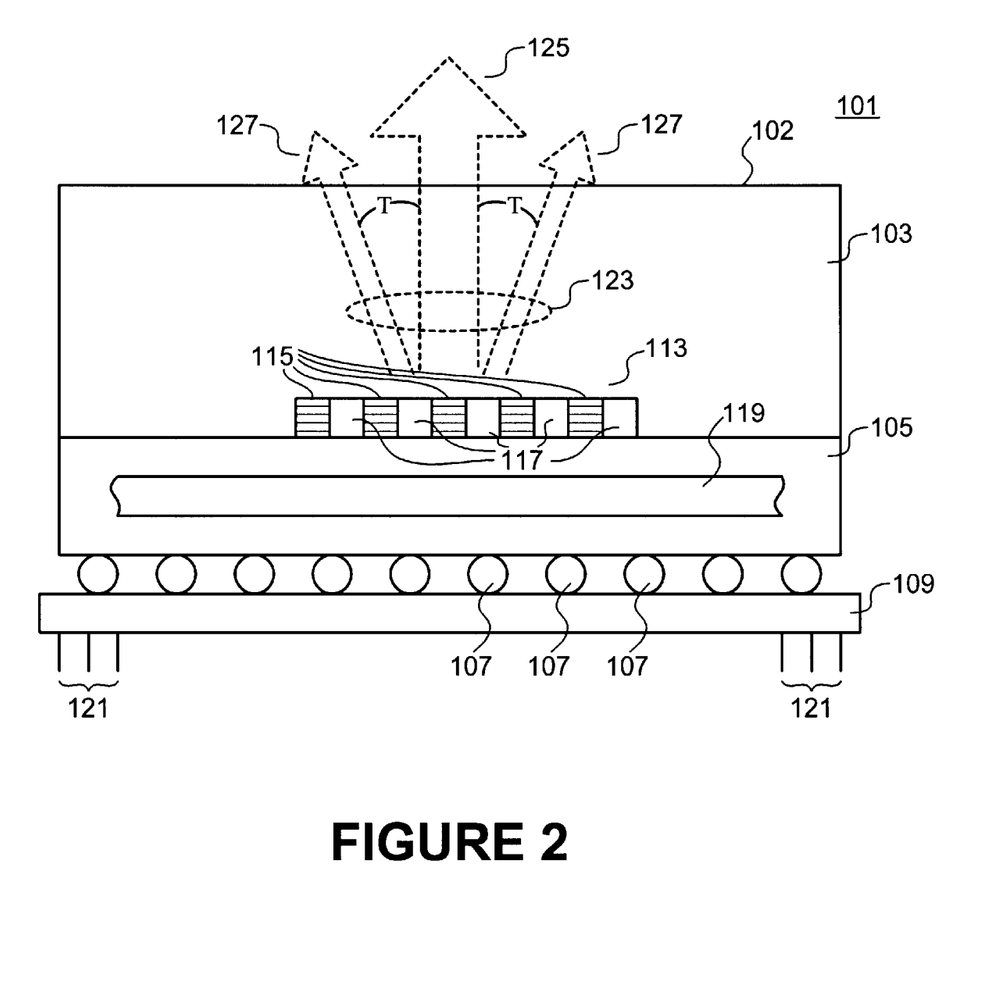
FIG. 2 is an illustration of a cross section of one embodiment of a flip chip packaged integrated circuit die with light being reflected from an optical modulator having zero order and non-zero order diffractions in accordance with the teachings of the present invention.

Referring now to FIG. 2, integrated circuit die 101 of FIG. 1 is shown with diffracted light 123, which includes zero order diffraction 125 and non-zero order diffractions 127, being deflected from deflector 119 through diffraction grating 113. As shown in FIG. 2, non-zero order diffractions 127 are deflected from diffraction grating 113 at an angle θ relative to zero order diffraction 125. The angle θ may be determined using the known grating equation:

$$a \sin \theta_m = m\lambda \qquad \text{(Equation 1)}$$

where a is the distance between charged or uncharged regions of diffraction grating 113, m specifies the particular diffraction order and λ is the wavelength of light.

Thus, in one embodiment, the angle θ may be adjusted by adjusting the distance a between charged or uncharged regions of diffraction grating 113. In one embodiment, the plurality of charged regions 115 and the plurality of uncharged regions 117 may be arranged in alternating fashion. The plurality of charged regions 115 may then be electrically redistributed using known switching techniques to adjust the distance a between each of the charged regions. For example, the charged regions may be redistributed electrically using known switching techniques such that there are two or more uncharged regions 117 between each charged region 115 to adjust the angle θ.

Referring back to FIG. 2, a portion of both the incoming and the outgoing diffracted light 123 passes through charged regions 115 and another portion of the incoming and outgoing diffracted light 123 passes through uncharged regions 117. In one embodiment, the amount of free charge in charged regions 115 is modulated in response to an integrated circuit output signal in integrated circuit die 101. In one embodiment, the amount of free charge in uncharged regions 117 is not modulated in response to the integrated circuit signal of integrated circuit die 101.

In one embodiment, diffraction grating 113 is a silicon phase grating including a two-dimensional array of complementary metal oxide semiconductor (CMOS) integrated circuit devices. In one embodiment, the phase of the portion of diffracted light 123 passing through charged regions 115 is modulated due to the plasma optical effect. In contrast, the phase of the portion of diffracted light 123 passing through uncharged regions 117 is not modulated in response to the integrated circuit signal.

The plasma optical effect arises due to an interaction between the optical electric field vector and free charge carriers that may be present along the propagation path of the light beam 111. The electric field of the light beam 111 polarizes the free charge carriers and this effectively perturbs the local dielectric constant of the medium. This in turn leads to a perturbation of the local velocity of the optical wave and hence the refractive index for the light, since the refractive index is simply the ratio of the speed of the light in vacuum to that in the medium. The free charge carriers also lead to absorption of the optical field as optical energy is used up, to accelerate the free charge carriers. Generally the refractive index perturbation is a complex number with the real part being that part which causes the velocity change and the imaginary part being related to the free charge carrier absorption. The amount of phase shift due to free charge carriers due to the plasma optical effect is given by:

$$\phi = n_o \omega_p^2 \lambda L/(4\pi c^2) \qquad \text{(Equation 2)}$$

where $\phi$ is the phase shift, $n_o$ is the nominal index of refraction, $\omega_p^2$ is the plasma optical frequency, $\lambda$ is the wavelength of light, L is the thickness of the free charge carrier region and c is the speed of light.

As a result of the phase shifting due to the plasma optical effect, interference occurs between the phase modulated and non-phase portions of modulated diffracted light 123 causing constructive and destructive interference in the wavefronts that propagate away from diffraction grating 113. In particular, when diffraction grating 113 is switched on, optical power is redistributed due to interference from the zero order and higher non-zero orders. Accordingly, the zero order diffraction 125 and non-zero order diffractions 127 of diffracted light beam 123 that pass through and propagates away from diffraction grating 113 are amplitude modulated in response to the integrated output circuit signal that modulates the amount of free charge in charged regions 115.

One solution to detecting the modulation is to observe either zero order diffraction 125 or at least one of the non-zero order diffractions 127 (e.g. first order diffraction). If one observes the zero order diffraction, a photo detector (not shown) receiving the reflected light sees a nominal direct current (DC) power when diffraction grating 113 is switched off and reduced power when diffraction grating 113 is switched on. If one observes a non-zero order diffraction 127, such as for example the first order diffraction, the photo detector sees zero power when diffraction grating 113 is switched off and finite power when diffraction grating 113 is switched on. Therefore, the integrated circuit signal may be extracted from the integrated circuit through the amplitude modulated zero order diffraction 125 or non-zero order diffractions 127 of diffracted light beam 123. In one embodiment, when extracting the integrated circuit signal, either the zero order diffraction 125 or the non-zero order diffractions 127, but not both, are observed. Indeed, if both zero order diffraction 125 and non-zero order diffractions 127 are simultaneously received by a photo detector, the net amount of optical power would remain substantially unchanged since diffraction grating 113 merely redistributes the optical power among the zero order diffraction 125 and non-zero order diffractions 127.

It is noted that additional detailed information describing diffraction grating 113 is described in co-pending application Ser. No. 08/993,786, filed Dec. 19,1997, now U.S. Pat. No. 6,075,908 entitled "Method and Apparatus for Optically Modulating Light through the Back Side of an Integrated Circuit Die," and assigned to the Assignee of the present application.

Figure 3:
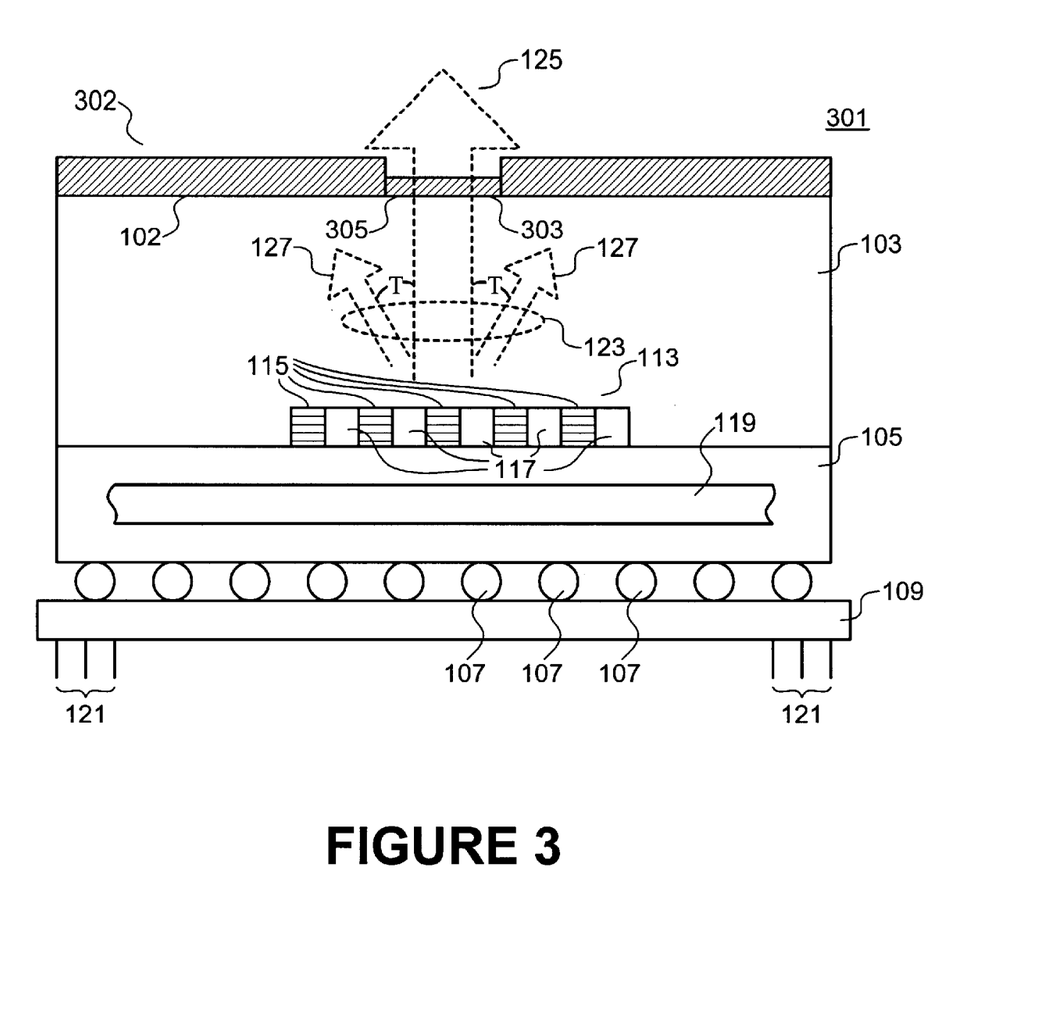
FIG. 3 is an illustration of a cross section of one embodiment of an optical modulator rejecting higher order diffractions in accordance with the teachings of the present invention.

FIG. 3 is a cross-section illustration of an optical modulator in accordance with the teachings of the present invention. As shown, flip chip packaged integrated circuit die 301 includes diffraction grating 113 disposed within the semiconductor substrate 103 of integrated circuit die 301. In one embodiment, diffraction grating 113 is electrically addressable and switchable, and includes an arrangement of a plurality of charged regions 115 distributed among a plurality of uncharged regions 117. In one embodiment, diffracted light 123, which includes zero order diffraction 125 and non-zero order diffractions 127, is deflected from deflector 119 through diffraction grating 113. As shown in FIG. 3, non-zero order diffractions 127 are deflected from diffraction grating 113 at an angle θ relative to zero order diffraction 125 in accordance with Equation 1 above.

As shown in the embodiment illustrated in FIG. 3, integrated circuit 301 includes an optical block 302 having an optical passage 303 through which zero order diffraction 125 may pass. Thus, zero order diffraction 125 is directed from diffraction grating 113 through optical passage 303 back out the back side 102 of the semiconductor substrate 103. As also shown in FIG. 3, optical block 302 is disposed proximate to optical passage 303 and blocks non-zero order diffractions 127 from passing back out the back side 102 of semiconductor substrate 103. Therefore, a receiver (not shown) is optically coupled to receive substantially only zero order diffraction 125 and is therefore able to extract the integrated circuit signal.

In one embodiment, optical block 302 is an opaque layer disposed on the back side 102 surface of semiconductor substrate 103. In one embodiment, the back side 102 surface is coated with a metal such as for example but not limited to aluminum. In another embodiment, optical block 302 includes another reflecting or absorbing material in accordance with the teachings of the present invention.

As shown in FIG. 3, one embodiment of optical passage 303 is an opening in optical block 302 that is large enough to allow an input light beam 111 to enter, as shown in FIG. 1, and allow zero order diffraction 125 to exit semiconductor substrate 103. In addition, optical passage 303 is small enough to prevent substantially non-zero order diffractions 127 from exiting semiconductor substrate 103 because of their angle θ relative to zero order diffraction 125. In one embodiment, non-zero order diffractions 127 are reflected back from optical block 302, or are absorbed by optical block 302.

In one embodiment, optical block 302 is formed by first coating the entire back side 102 surface of semiconductor substrate 103 with the reflecting or absorbing material. Then, optical passage 303 is formed in one embodiment by etching a hole in optical block 302 such that zero order diffraction 125 may pass. In one embodiment, an antireflective (AR) coating 305 is applied in optical passage 303 to improve the transmission of light, such as for example light beam 111 and zero order diffraction 125, into and out of the semiconductor substrate 103, respectively. In one embodiment, AR coating 305 is applied between the back side 102 surface of semiconductor substrate 103 and air.

Figure 4:
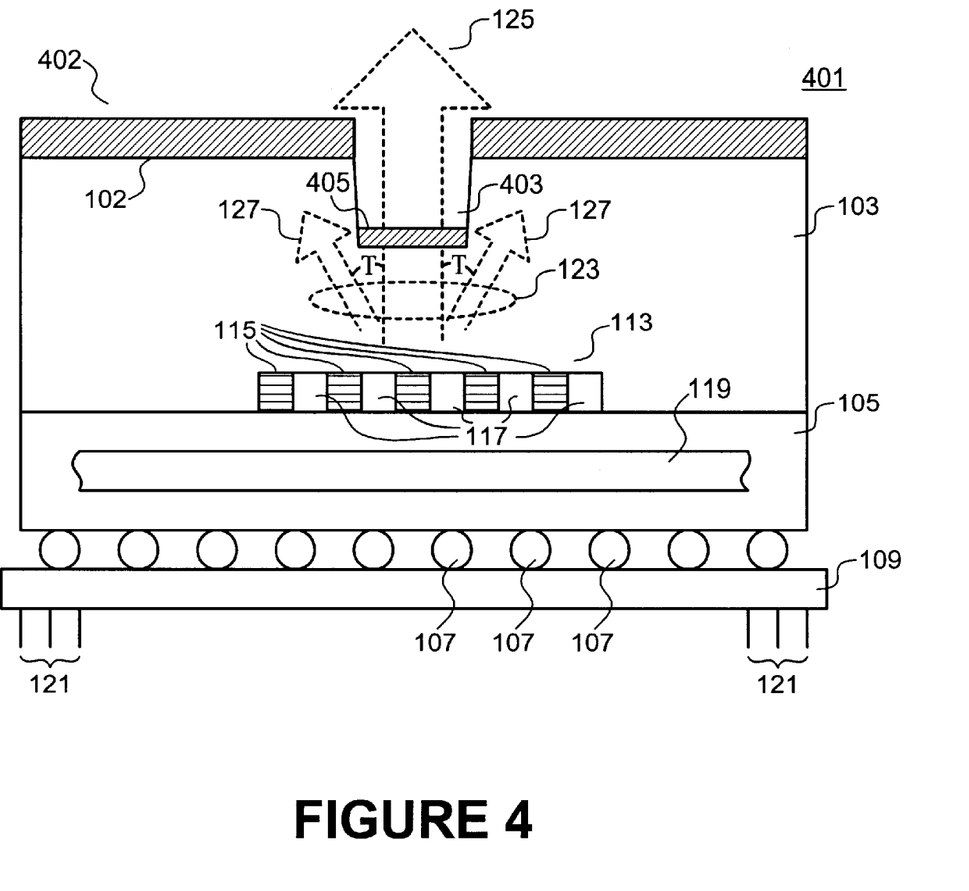
FIG. 4 is an illustration of a cross section of another embodiment of an optical modulator rejecting higher order diffractions in accordance with the teachings of the present invention.

FIG. 4 is a cross-section illustration of another embodiment of an optical modulator in accordance with the teachings of the present invention. As shown, flip chip packaged integrated circuit die 401 includes diffraction grating 113 disposed within the semiconductor substrate 103 of integrated circuit die 401. Diffracted light 123, which includes zero order diffraction 125 and non-zero order diffractions 127, is deflected from deflector 119 through diffraction grating 113. As shown in FIG. 4, non-zero order diffractions 127 are deflected from diffraction grating 113 at an angle θ relative to zero order diffraction 125 in accordance with Equation 1 above.

As shown in FIG. 4, integrated circuit 401 includes an optical block 402 having an optical passage 403 through which zero order diffraction 125 may pass. Thus, zero order diffraction 125 is directed from diffraction grating 113 through optical passage 403 back out the back side 102 of the semiconductor substrate 103. As also shown in FIG. 4, optical block 402 is disposed proximate to optical passage 403 and substantially blocks non-zero order diffractions 127 from passing back out the back side 102 of semiconductor substrate 103.

In one embodiment, optical block 402 is an opaque layer disposed on the back side 102 surface of semiconductor substrate 103. In one embodiment, the back side 102 surface is coated with a metal such as for example but not limited to aluminum. In another embodiment, optical block 402 includes another reflecting or absorbing material in accordance with the teachings of the present invention.

As shown in FIG. 4, one embodiment of optical passage 403 includes a hole or trench in the back side 102 of semiconductor substrate 103. In this embodiment, the hole or trench of optical passage 403 reduces the amount of semiconductor substrate 103 through which light beam 111 and zero order diffraction 125 must pass when entering and exiting semiconductor substrate 103. By reducing the amount of semiconductor substrate 103 through which light beam 111 and zero order diffraction 125 must pass, the amount of attenuation of these light beams is reduced. Indeed, the amount of semiconductor substrate 103 through which light beam 111 and zero order diffraction 125 pass is reduced when compared to integrated circuit die 301 of FIG. 3. In one embodiment, AR coating 405 is applied in optical passage 403 of FIG. 4 to reduce further the attenuation of light beam 111 and zero order diffraction 125.

As shown in FIG. 4, the shape of the side walls of optical passage 403 may be used to block or deflect out non-zero order diffractions 127. In one embodiment, the side walls of optical passage 403 are formed when trenched such that the incident angles of non-zero order diffractions 127 are so high that non-zero order diffractions 127 are internally deflected within semiconductor substrate 103.

Figure 5:
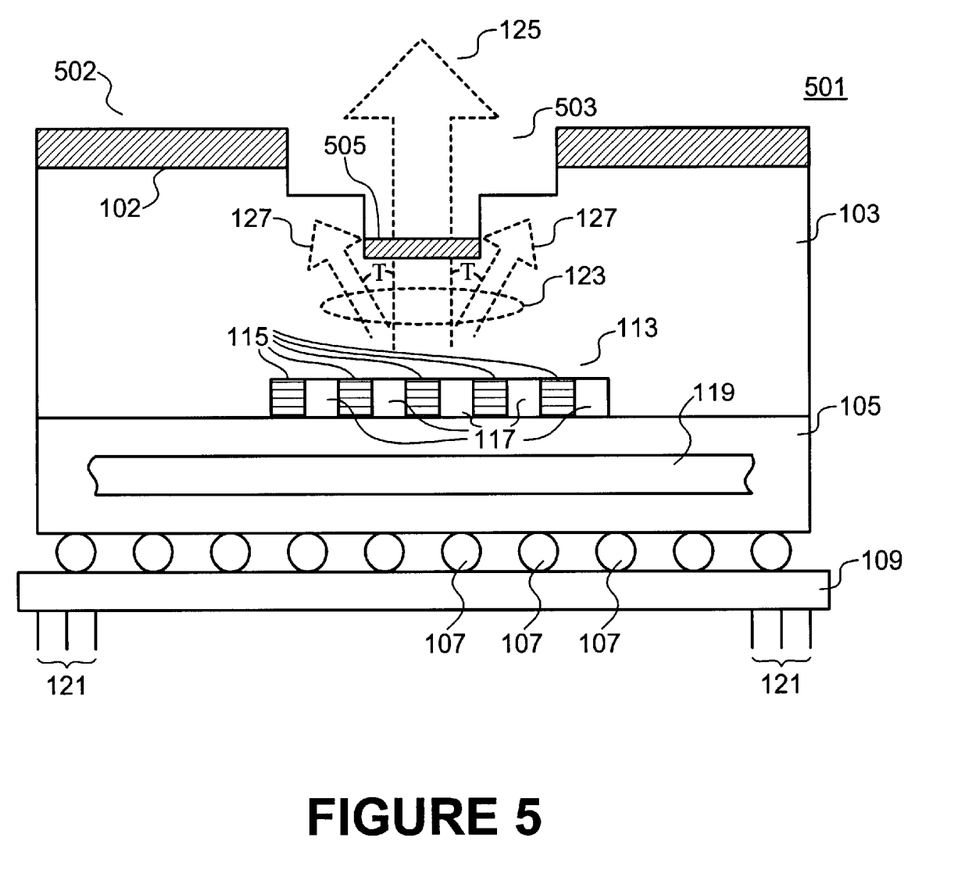
FIG. 5 is an illustration of a cross section of yet another embodiment of an optical modulator rejecting higher order diffractions in accordance with the teachings of the present invention.

FIG. 5 is a cross-section illustration of yet another embodiment of an optical modulator in accordance with the teachings of the present invention. As shown, flip chip packaged integrated circuit die 501 includes diffraction grating 113 disposed within the semiconductor substrate 103 of integrated circuit die 501. Diffracted light 123, which includes zero order diffraction 125 and non-zero order diffractions 127, is deflected from deflector 119 through diffraction grating 113. As shown in FIG. 5, non-zero order diffractions 127 are deflected from diffraction grating 113 at an angle θ relative to zero order diffraction 125.

As shown in FIG. 5, integrated circuit 501 includes an optical block 502 having an optical passage 503 through which zero order diffraction 125 may pass. Thus, zero order diffraction 125 is directed from diffraction grating 113 through optical passage 503 back out the back side 102 of the semiconductor substrate 103. As also shown in FIG. 5, optical block 502 is disposed proximate to optical passage 503 and substantially blocks non-zero order diffractions 127 from passing back out the back side 102 of semiconductor substrate 103.

As shown in FIG. 5, one embodiment of optical passage 503 includes a hole or trench in the back side 102 of semiconductor substrate 103. Similar to the embodiment illustrated in FIG. 4, the hole or trench of optical passage 503 reduces the amount of semiconductor substrate 103 through which light beam 111 and zero order diffraction 125 must pass when entering and exiting semiconductor substrate 103. In one embodiment, AR coating 505 is applied in optical passage 503 of FIG. 5 to reduce further the attenuation of light beam 111 and zero order diffraction 125.

As shown in FIG. 5, one embodiment of the side walls of optical passage 503 may be shaped specifically to block or deflect out non-zero order diffractions 127. In one embodiment, the side walls of optical passage 503 are formed by etching, trenching or the like such that the incident angles of non-zero order diffractions 127 result in the non-zero order diffractions 127 being internally deflected within semiconductor substrate 103.

Figure 6:
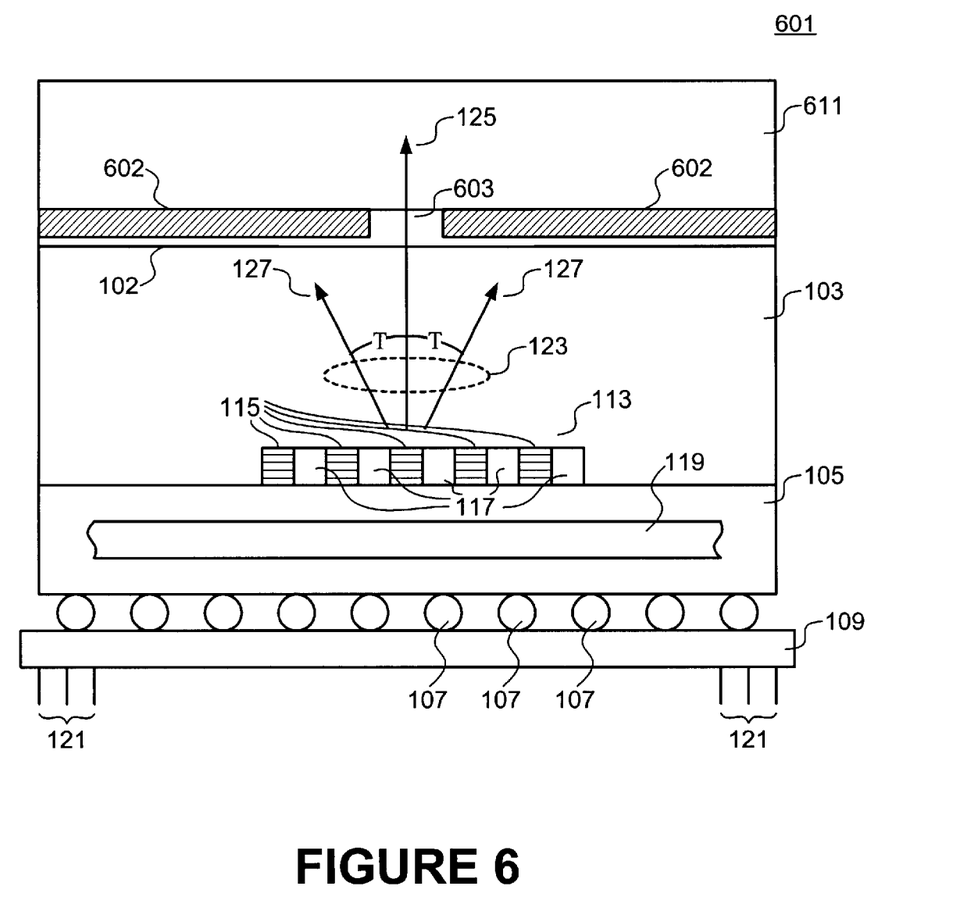
FIG. 6 is an illustration of a cross section of another embodiment of an optical modulator rejecting higher order diffractions in accordance with the teachings of the present invention.

FIG. 6 is a cross-section illustration of another embodiment of an optical modulator in accordance with the teachings of the present invention. As shown, flip chip packaged integrated circuit die 601 includes diffraction grating 113 disposed within the semiconductor substrate 103 of integrated circuit die 601. Diffracted light 123, which includes zero order diffraction 125 and non-zero order diffractions 127, is deflected from deflector 119 through diffraction grating 113. As shown in FIG. 6, non-zero order diffractions 127 are deflected from diffraction grating 113 at an angle θ relative to zero order diffraction 125.

As shown in FIG. 6 integrated circuit die 601 also includes an optics assembly 611 disposed proximate to a back side 102 of semiconductor substrate 103. In one embodiment, optics assembly 611 includes diffractive optics, such as for example but not limited to a hologram or the like to direct optical beams to and from diffraction grating 113 using known techniques. In one embodiment, optics assembly 611 includes optical block 602 having an optical passage of 603 through which zero order diffraction 125 may pass. Thus, zero order diffraction 125 is directed from diffraction grating 113 through optical passage 603 back out the back side 102 of the semiconductor substrate 103. As also shown in FIG. 6, optical block 602 is disposed proximate to optical passage 603 and substantially blocks non-zero order diffractions 127 from passing back out the back side 102 of semiconductor substrate 103.

Figure 7:
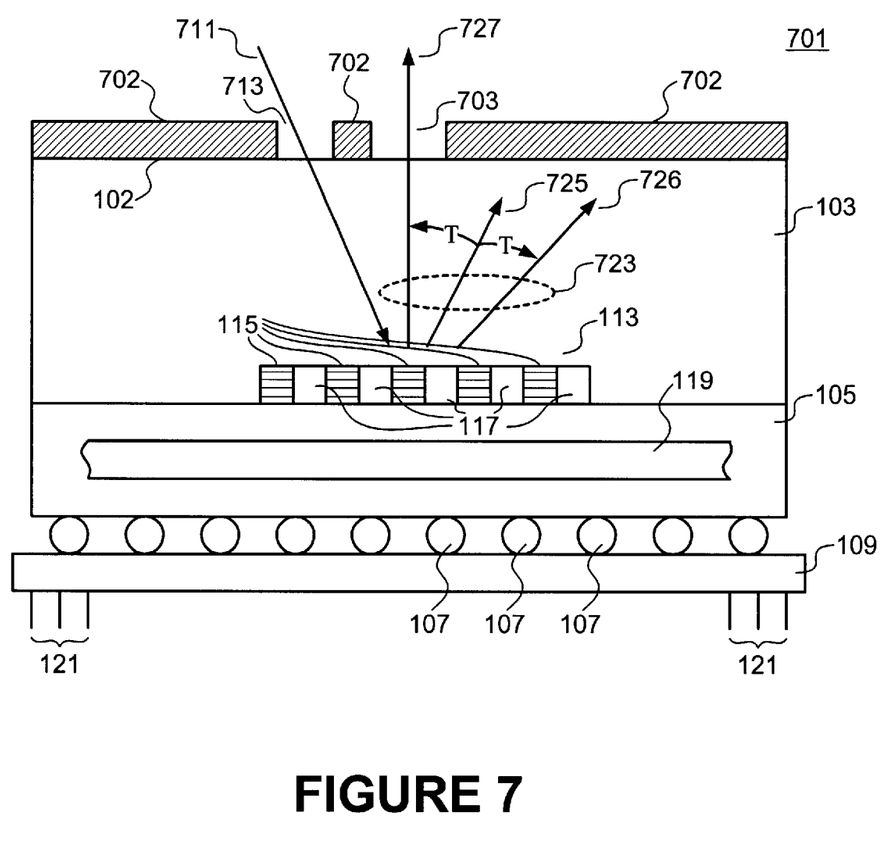
FIG. 7 is an illustration of a cross section of one embodiment of an optical modulator passing a non-zero order diffraction in accordance with the teachings of the present invention.

FIG. 7 is a cross-section illustration of another embodiment of an optical modulator in accordance with the teachings of the present invention. As shown, flip chip packaged integrated circuit die 701 includes diffraction grating 113 disposed within the semiconductor substrate 103 of integrated circuit die 701. In one embodiment, diffraction grating 113 is electrically addressable and switchable, and includes an arrangement of a plurality of charged regions 115 distributed among a plurality of uncharged regions 117. In one embodiment, diffracted light 723, which includes zero order diffraction 725 and non-zero order diffractions 726 and 727, is deflected from deflector 119 through diffraction grating 113. As shown in FIG. 7, non-zero order diffractions 726 and 727 are deflected from diffraction grating 113 at an angle θ relative to zero order diffraction 725 in accordance with Equation 1 above.

In one embodiment, the plurality of charged regions 115 and the plurality of uncharged regions 117 are electrically switched using known techniques to adjust the distance a according to Equation 1 above. For example purposes only, in one embodiment every other region of diffraction grating 113 may be switched to be charged in one setting and every third region of diffraction grating 113 may be switched to be charged in another setting in response to the integrated circuit signal. By adjusting the distance a between charged or uncharged regions of diffraction grating 113, the angle θ may be adjusted in response to an integrated circuit signal on integrated circuit die 701 in accordance with the teachings of one embodiment of the present invention.

As shown in the embodiment illustrated in FIG. 7, integrated circuit 701 includes an optical block 702 having optical passages 713 and 703. In one embodiment, incident optical beam 711 is directed through optical passage 713 to diffraction grating 113. Non-zero order diffraction 727 is directed away from diffraction grating 113. In one embodiment, the angle θ may be selectively adjusted in response to the integrated circuit signal such that non-zero order diffraction 727 is directed through optical passage 703 back out the back side 102 of semiconductor substrate 103. In addition, angle θ may be selectively adjusted in response to the integrated circuit signal such that non-zero order diffraction 727 is blocked by optical block 702. In one embodiment, non-zero order diffraction 727 is a first order diffraction. Therefore, a receiver (not shown) optically coupled to receive non-zero order diffraction 727 through optical passage 703 is able to extract the integrated circuit signal from integrated circuit die 701.

In the foregoing detailed description, the method and apparatus of the present invention has been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. An optical modulator, comprising:
   a diffractor disposed in a semiconductor substrate of an integrated circuit die, the diffractor to produce a diffracted optical beam in response to a signal, the diffracted optical beam to include a plurality of diffraction orders;
   an optical passage through which one of the plurality of diffraction orders passes, said one of the diffraction orders directed from the diffractor through the semiconductor substrate to pass through the optical passage, wherein an optical beam is to be directed through the optical passage through the semiconductor substrate to the diffractor; and
   an optical block disposed proximate to the optical passage, the optical block to block other ones of the plurality of diffraction orders from passing.

2. The optical modulator described in claim 1 wherein the optical block comprises an opaque layer disposed on a surface of the semiconductor substrate.

3. The optical modulator described in claim 2 wherein the opaque layer comprises a metal film.

4. The optical modulator described in claim 2 wherein the opaque layer includes an opening to allow said one of the diffraction orders to pass, the optical passage comprising the opening in the opaque layer.

5. The optical modulator described in claim 2 wherein the surface of the semiconductor substrate comprises a back side surface of the semiconductor substrate.

6. The optical modulator described in claim 1 wherein the optical passage comprises an antireflective coating disposed on a surface of the semiconductor substrate.

7. The optical modulator described in claim 6 wherein the surface of the semiconductor substrate comprises a back side surface of the semiconductor substrate.

8. The optical modulator described in claim 1 wherein the optical passage comprises a trench disposed in a surface of the semiconductor substrate.

9. The optical modulator described in claim 8 wherein the surface of the semiconductor substrate comprises a back side surface of the semiconductor substrate.

10. The optical modulator described in claim 1 wherein the semiconductor substrate comprises silicon.

11. The optical modulator described in claim 1 wherein the integrated circuit die is a flip chip packaged integrated circuit die.

12. The optical modulator described in claim 1 wherein the diffracted optical beam comprises infrared light.

13. A method of modulating an optical beam, the method comprising:
   directing an optical beam onto a diffractor disposed in a semiconductor substrate of an integrated circuit die;
   diffracting in response to a signal the optical beam with the diffractor to produce a diffracted optical beam, the diffracted optical beam to include a plurality of diffraction orders;
   passing one of the plurality of diffraction orders through the semiconductor substrate and out of the semiconductor substrate through an optical passage, wherein directing the optical beam onto the diffractor includes directing the optical beam into the semiconductor substrate through the optical passage; and
   blocking other ones of the plurality of diffraction orders with an optical block disposed proximate to the optical passage.

14. The method described in claim 13 wherein directing the optical beam onto the diffractor includes directing the optical beam through an antireflective coating disposed on a back side surface of the semiconductor substrate.

15. The method described in claim 13 including reflecting onto the diffractor the optical beam directed through the optical passage.

16. The method described in claim 13 wherein blocking said other ones of the plurality of diffraction orders includes reflecting said other ones of the plurality of diffraction orders.

17. The method described in claim 13 wherein blocking said other ones of the plurality of diffraction orders includes absorbing said other ones of the plurality of diffraction orders.

18. A method of providing an optical modulator, comprising:
   disposing a diffractor in a semiconductor substrate of an integrated circuit die;
   coupling the diffractor to receive a signal, the diffractor to produce a diffracted optical beam in response to the signal, the diffracted optical beam to include a plurality of diffraction orders;
   optically coupling an optical passage to the diffractor such that one of the plurality of diffraction orders is to be directed from the diffractor through the semiconductor substrate to pass through the optical passage;

disposing an optical block proximate to the optical passage, the optical block to block other ones of the plurality of diffraction orders from passing; and forming an opaque layer on a back side surface of the semiconductor substrate to form the optical block.

19. The method described in claim 18 including forming an opening in the opaque layer to form the optical passage.

20. The method described in claim 19 including forming an antireflective coating in the opening.

21. The method described in claim 18 including the additional step of forming a trench in a back side surface of the semiconductor substrate to reduce attenuation of said one of the plurality of diffraction orders, the trench to include the optical passage.

22. The method described in claim 18 wherein forming the opaque layer includes coating the back side surface of the semiconductor substrate with an absorbing layer.

23. The method described in claim 18 wherein forming the opaque layer includes coating the back side surface of the semiconductor substrate with a reflecting layer.

24. The method described in claim 18 wherein said one of the plurality of diffraction orders comprises a zero order diffraction of the diffracted optical beam.

25. The method described in claim 18 wherein said one of the plurality of diffraction orders comprises a first order diffraction of the diffracted optical beam.

26. The method described in claim 18 including providing the optical passage in an optics assembly disposed proximate to the back side of the integrated circuit die.

27. The method described in claim 18 including providing the optical block in an optics assembly disposed proximate to the back side of the integrated circuit die.

* * * * *

UNITED STATES PATENT AND TRADEMARK OFFICE
CERTIFICATE OF CORRECTION

PATENT NO. : 6,330,376 B1
DATED : December 11, 2001
INVENTOR(S) : Paniccia

It is certified that error appears in the above-identified patent and that said Letters Patent is hereby corrected as shown below:

Column 2,
Line 29, delete "This of diffraction order is directed" and insert -- The one of the diffraction orders is directed --.
Line 33, delete "other diffraction orders" and insert -- other ones of the plurality of diffraction orders --.

Signed and Sealed this

First Day of October, 2002

Attest:

Attesting Officer

JAMES E. ROGAN
Director of the United States Patent and Trademark Office